United States Patent
Gustafsson

(10) Patent No.: US 11,809,275 B2
(45) Date of Patent: Nov. 7, 2023

(54) FAAS IN-MEMORY CHECKPOINT RESTORE

(71) Applicant: Telefonaktiebolaget LM Ericsson (publ), Stockholm (SE)

(72) Inventor: Harald Gustafsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 641 days.

(21) Appl. No.: 16/965,509

(22) PCT Filed: Jan. 29, 2018

(86) PCT No.: PCT/EP2018/052146
§ 371 (c)(1),
(2) Date: Jul. 28, 2020

(87) PCT Pub. No.: WO2019/145053
PCT Pub. Date: Aug. 1, 2019

(65) Prior Publication Data
US 2021/0049070 A1    Feb. 18, 2021

(51) Int. Cl.
*G06F 11/00* (2006.01)
*G06F 11/14* (2006.01)
(Continued)

(52) U.S. Cl.
CPC ...... *G06F 11/1407* (2013.01); *G06F 11/1438* (2013.01); *G06F 12/0292* (2013.01); *G06F 12/0882* (2013.01); *G06F 16/188* (2019.01)

(58) Field of Classification Search
CPC ............. G06F 11/1407; G06F 11/1438; G06F 12/0292; G06F 12/0882; G06F 16/188
See application file for complete search history.

(56) References Cited

U.S. PATENT DOCUMENTS 7,779,295 B1    8/2010    Shah et al.
10,176,046 B1 *  1/2019    Hu .................... G06F 3/0619
(Continued)

FOREIGN PATENT DOCUMENTS

WO    2006026403 A2    3/2006

OTHER PUBLICATIONS

Huang, Cheng-Hao, et al., "Enhancing the Availability of Docker Swarm Using Checkpoint- and-Restore", 2017 14th International Symposium on Pervasive Systems, Algorithms and Networks & 2017 11th International Conference on Frontier of Computer Science and Technology & 2017 Third International Symposium of Creative Computing, 2017, pp. 357-362.
(Continued)

*Primary Examiner* — Joshua P Lottich
(74) *Attorney, Agent, or Firm* — Murphy, Bilak & Homiller, PLLC

(57) ABSTRACT

A method for use in a computing device (100) for executing a FaaS process, said computing device (100) comprising a processor arrangement (110) and a memory (120), wherein the method comprises: receiving an event associated with a trigger, whereby an associated function is selected; obtaining page references to existing physical memory pages; initiating a process virtual memory table for a corresponding process; and executing the process based on the virtual memory table. And a method for use in a computing device (100) for performing a FaaS checkpoint operation, said computing device (100) comprising a processor arrangement (110) and a memory (120), wherein the method comprises: initiating a checkpoint is initiated; obtaining page references and storing them in a database virtual memory table in an in-memory database; replicating the page tables and indexes through a network; and storing changes to the in-memory database.

14 Claims, 6 Drawing Sheets

(51) Int. Cl.
  *G06F 16/188* (2019.01)
  *G06F 12/02* (2006.01)
  *G06F 12/0882* (2016.01)

(56) References Cited

U.S. PATENT DOCUMENTS

| | | | |
|---|---|---|---|
| 10,216,583 B1* | 2/2019 | Krinke | G06F 16/184 |
| 10,223,131 B1* | 3/2019 | Lieberman | G06F 11/3664 |
| 10,990,297 B1* | 4/2021 | Hu | G06F 3/0619 |
| 2005/0050295 A1 | 3/2005 | Noel et al. | |
| 2017/0134518 A1 | 5/2017 | Abali et al. | |
| 2018/0260237 A1* | 9/2018 | Noll | G06F 11/1446 |
| 2019/0065267 A1* | 2/2019 | van Riel | G06F 9/45558 |
| 2019/0171966 A1* | 6/2019 | Rangasamy | G06F 11/3006 |
| 2020/0057669 A1* | 2/2020 | Hutcheson | G06F 3/0659 |
| 2020/0057697 A1* | 2/2020 | Yeung | G06F 11/1466 |
| 2020/0159625 A1* | 5/2020 | Hutcheson | G06F 11/1461 |

OTHER PUBLICATIONS

Oakes, Edward, "Pipsqueak: Lean Lambdas with Large Libraries", IEEE 37th International Conference on Distributed Computing Systems Workshops, 2017, pp. 395-400.

Silberschaiz, Abraham, et al., "Operating System Concepts, 8th Edition", John Wiley & Sons, Inc., 2009, pp. 1-982.

Unknown, Author, "Application checkpointing", Wikipedia, Apr. 20, 2020, pp. 1-5.

Unknown, Author, "CRIU", Version: 3.8 "Snow Bunting", Mar. 13, 2018, pp. 1-4.

Unknown, Author, "Function as a service", Wikipedia, Apr. 3, 2020, pp. 1-2.

Unknown, Author, "Kernel same-page merging", Wikipedia, Feb. 10, 2020, pp. 1-2.

\* cited by examiner

In memory Data Base index

FAAS IN-MEMORY CHECKPOINT RESTORE

TECHNICAL FIELD

This application relates to a computing device, a method and a computer-readable storage medium for improved memory management, and in particular to a cloud-enabled computing device, a method and a computer-readable storage medium for improved memory management for FaaS functions.

BACKGROUND

Function as a service (FaaS) is a category of cloud computing services that provides a platform allowing customers to develop, run, and manage application functionalities without the complexity of building and maintaining the infrastructure typically associated with developing and launching an application (commonly referred to as an app). Building an application following this model is one way of achieving a "serverless" architecture, and is typically used when building microservices applications or other applications using a service-oriented architecture (SOA) architectural style that structures an application as a collection of loosely coupled services.

Function as a Service (FaaS) is thus a method of offering developers a service where they only need to specify the function that is to be executed when a trigger event happens. The cloud service provider will manage the infrastructure and underlying support of virtual machines, containers, operating systems, language frameworks, etc.

A function typically only operated during a relatively short time period, ranging from a few milliseconds to a few seconds, and the setup time can therefore make up a large or major portion of the total time from receiving the trigger event until the application has executed.

Checkpointing is a method to freeze a running process and store the information (place a checkpoint) onto a larger memory, such as a memory disc, and then later restoring the process from the checkpoint by retrieving the execution status and data from the checkpoint.

In computing, kernel same-page merging (abbreviated as KSM, and also known as kernel shared memory and memory merging) is a kernel feature that makes it possible for a hypervisor system to share identical memory pages amongst different processes or virtualized guests. While not directly linked, Kernel-based Virtual Machine (KVM) can use KSM to merge memory pages occupied by virtual machines. KSM performs the memory sharing by scanning through the main memory and finding duplicate pages. Each detected duplicate pair is then merged into a single page, and mapped into both original locations. The page is also marked as "copy-on-write" (COW), so the kernel will automatically separate them again should one process modify its data. For example, the Linux kernel periodically scans memory pages to identify if they are equal and then can merge them by have the virtual memory pages reference to only one of the physical memory pages. It also marks them as copy-on-write, so that if one of the virtual memory pages should be modified, it is first copied into a unique physical memory page. Physical memory pages can be shared between any processes when identical independent of authentication and authorization without security issues.

The inventors have realized, after insightful and inventive reasoning, that there are problems with these techniques.

For FaaS solutions having so-called "warm" and "cold" starts of functions, similar to hard and soft booting of a computer, i.e. at first event the setup time is long due to a cold start of the environment and then subsequent events that happens within a time window will utilize the same started environment and hence get a warm start. Still this start gives a long latency compared with using a permanent service that handles events. The problem with warm-started environments is that they consume memory resources even when not in use and when many functions in the FaaS are used they add up and use too much memory. There is thus a trade-off between memory use and latency.

The inventors have also realized that the kernel same-memory page merging does not work well for FaaS due to that the environments are short-lived. The inventors have further realized that checkpointing does not work well due to that the checkpoints are saved to disc and the storing and restoring is thus much slower than keeping a function running in an operating process.

There is thus a need for an efficient manner of providing pausing and restarting of processes that maintains a low latency and a low memory consumption.

SUMMARY

The inventors have realised, after inventive reasoning, that by an insightful arrangement and categorization of the memory pages, memory space may be saved and memory access may be made fast and efficient.

This is achieved by changing the trade-off between memory consumption and startup latency, by keeping the execution environment in memory and making sure that when a function is triggered, the new process is directly created from existing memory pages while having functions' environments share as many memory pages as possible.

To enable this, the inventors are proposing a modified checkpointing to utilize memory and ensuring that the memory pages are equal to them that are used during execution. During creation of a process, an environment is created and then the modified checkpoint is used to store the result in an in-memory database preserving page alignment, preferable without copying. During restore the new process is created/restored with virtual memory areas (by the virtual page table) referring to the existing physical memory pages, which makes the restore almost immediate.

This is done step-by-step, in a tree structure with branches of checkpointed environments. At the root is the common environment, for example a container, at the first branch e.g. a choice between a Java Virtual Machine (JVM), a Python Virtual Machine (PVM), or native packages, etc. The following branches are for e.g. libraries or packages, and then the functions. Hence, when a new branch is to be created the previous checkpoint is restored and then the environment is altered with the new functionality before it is checkpointed again. This gives small changes to memory and hence most memory pages will still be shared with previous checkpoints. Also, many processes will be able to share many branches, and thus memory, thereby also saving on memory space, which also enables for a faster copy action, as only the leaf node needs to be copied.

A memory management system as herein, disclosed in more detail below, will bring a close to warm start startup latency to FaaS and preserve memory to allow a resource efficient implementation.

It is thus an object of the teachings of this application to overcome or at least mitigate one or more of the problems and shortcomings listed above and below by providing a method for use in a computing device for executing a FaaS process, said computing device comprising a processor arrangement and a memory, wherein the method comprises: receiving an event associated with a trigger, whereby an associated function is selected; obtaining page references to existing physical memory pages; initiating a process virtual memory table for a corresponding process; and executing the process based on the virtual memory table.

It is also an object of the teachings of this application to overcome or at least mitigate one or more of the problems and shortcomings listed above and below by providing a method for use in a computing device for performing a FaaS checkpoint operation, said computing device comprising a processor arrangement and a memory, wherein the method comprises: initiating a checkpoint is initiated; obtaining page references and storing them in a database virtual memory table in an in-memory database; replicating the page tables and indexes through a network; and storing changes to the in-memory database.

It is also an object of the teachings of this application to overcome or at least mitigate one or more of the problems and shortcomings listed above and below by providing a computing device for executing a FaaS process, said computing device comprising a processor arrangement and a memory, wherein processor arrangement is configured for: receiving an event associated with a trigger, whereby an associated function is selected; obtaining page references to existing physical memory pages; initiating a process virtual memory table for a corresponding process; and executing the process based on the virtual memory table.

It is also an object of the teachings of this application to overcome or at least mitigate one or more of the problems and shortcomings listed above and below by providing a computing device for performing a FaaS checkpoint operation, said computing device comprising a processor arrangement and a memory, wherein processor arrangement is configured for: initiating a checkpoint is initiated; obtaining page references and storing them in a database virtual memory table in an in-memory database; replicating the page tables and indexes through a network; and storing changes to the in-memory database.

It is moreover an object of the teachings of this application to overcome one or more of the problems and shortcomings listed above by providing a computer readable storage medium encoded with instructions that, when executed on a processor, perform a method as disclosed herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

Figure 1:
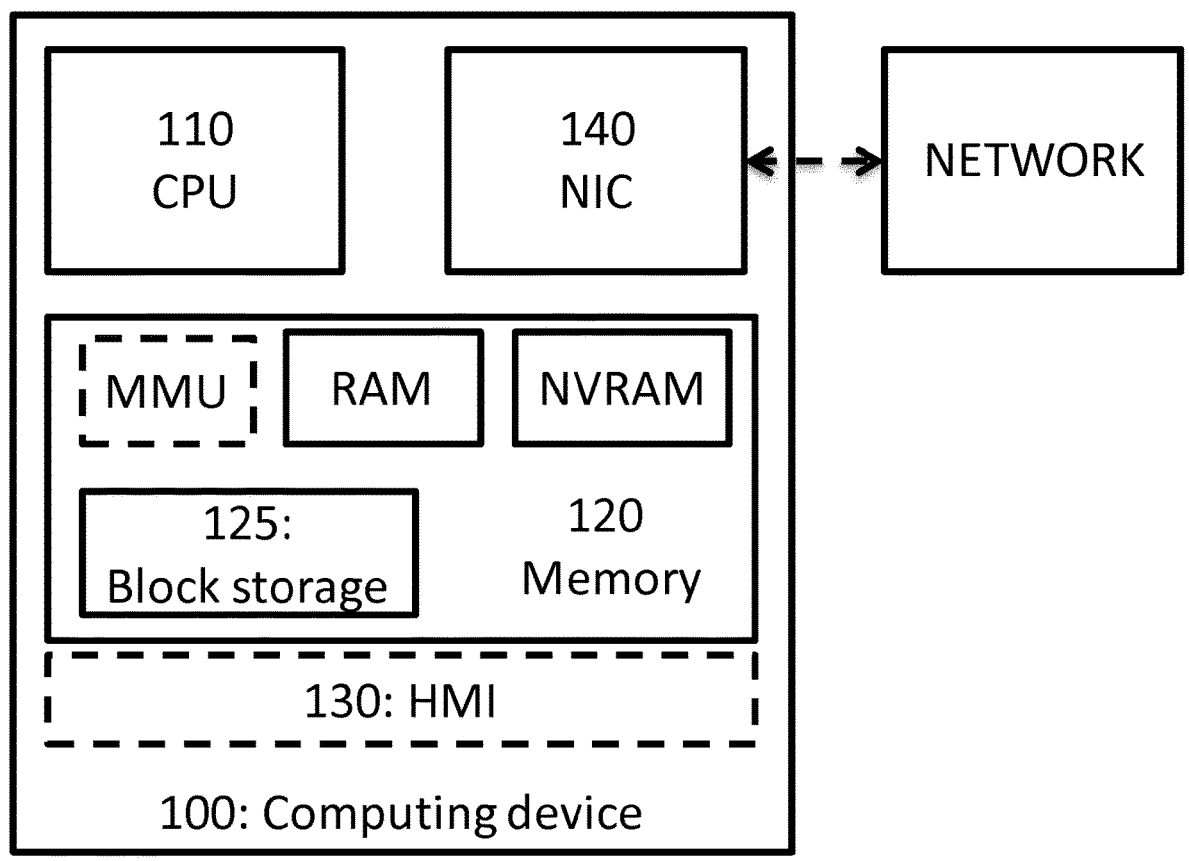
FIG. 1 shows a schematic overview of the components of a computing device or User Equipment according to one embodiment of the teachings of this application.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

The idea is to utilize a modified checkpoint/restore method in combination with an in-memory database. Memory here refers to byte/word-addressable memory which include standard volatile memory like SRAM and DRAM as well as the more recent non-volatile memory (NVRAM). NVRAM refers to any technologies which offers byte/word addressable memory and are persistent storage, having a price and performance point in-between DRAM and block storage Flash memory.

This is done step-by-step, or layer-by-layer, like a tree with branches of checkpointed environments. At the root is the common environment for example a container, at the first branch e.g. a choice between a Java Virtual Machine (JVM), a Python Virtual Machine (PVM), or native packages, etc. The following branches are for e.g. libraries or packages, and then the functions. At last, dynamically also the trigger data may be mapped in if it exist in physical memory already. Hence, when a new branch is to be created the previous checkpoint is restored and then the environment is altered with the new functionality before it is checkpointed again. This gives small changes to memory and hence most memory pages will still be shared with previous checkpoints A first aspect of the present invention is to modify the restore method of a checkpointing or checkpoint/restore framework (CRF) such as CRIU. The restore method of state of the art CRFs copy the application's memory content from a checkpoint image stored on a memory disk (i.e. a block storage). As the inventors have realised, such state of the art methods are reasonable for the use cases CRFs have been used for before, but for FaaS the start-up time is a large part of the total latency if the function's execution environment is not kept intact between trigger events (i.e. warm start). To be able to utilize CRFs for restoring a function's execution environment, the initialization time of memory needs to be reduced. This invention stores the checkpoint memory in an in-memory database on the same computer, so that it is immediately available. The modified restore method then don't need to copy the memory content from an image on disk but could just map the virtual memory areas to the existing physical memory areas that is maintained by the database. An alternative approach is to utilize lazy memory paging, which CRFs use for iterative live migrations (but they involving copying memory from a remote computer). The lazy memory paging loads a page when it is first access, which our modified restore method could utilize to then map the page to the existing physical memory page.

A second aspect of this invention is to reduce the memory need for the in-memory database and the restored function's execution environment (a process). The invention makes sure that as much of a function's execution environment memory content is equal and have identical layout to other functions or instances of the function's execution environment (EE). To accomplish this the function's EE is built up step-by-step as in a tree. With the functions on the leaves and branches as more and more refined EE. This can be done by loading a previous checkpointed layer and e.g. load in software packages, libraries or virtual machines, then checkpoint again at a further branch. Next could multiple functions utilize this latest checkpoint to create individual EE checkpoints for each function. This invention utilize a modified checkpoint method, which instead of copying the memory to an image on disk, transfer the virtual memory areas references to physical memory to an in-memory database. The database then claims the memory pages which prevents them from being destroyed. The database also keep an index in-memory similar in format to how a CRF keeps track of memory pages in a memory map stored on disk. The index is reduced further by the tree structure since large parts of the memory map is identical with lower branches, see FIGS. 4A and 4B and corresponding description further below.

FIG. 1 shows a schematic overview of a computing device 100 or User Equipment (UE) according to one embodiment of the present invention. The computing device may be a computer, such as a rackmount computer, a desktop computer, a laptop computer or other device arranged for computing. The UE may be a robotic tool, an actuator, a sensor or other automated industrial device. The UE may be a tablet computer, or a smartphone. In the following the description will be focussed on a computing device, but the teachings herein are applicable also to a UE 100.

The computing device 100 comprises a processor arrangement 110 (CPU) which is configured to control the overall functionality and also specific functions of the computing device 100 such as by executing computer program instructions loaded into or stored on a memory 120 connected to or being part of the processor arrangement 110. The processor arrangement 110 may comprise one or more processors or other logic programmable circuits for combined or individual execution of a task or application. However, for the purpose of this application they will be seen as being the one and same processor arrangement 110. The processor arrangement 110 is connected to or comprising the memory 120 for storing computer instructions and also data to be processed by the computer instructions when executed by the processor arrangement 110. The memory 120 may comprise one or several memory circuits, possibly arranged in a hierarchy. The memory may also comprise an MMU (Memory Management Unit), i.e. hardware arranged to handle virtual to physical mappings as well as memory protections (used for COW, lazy loading, etc), etc. One or more of such memory circuits may be comprised in the processor arrangement 110. For the purpose of this application the memory circuits will be regarded as one memory 120. The memory may comprise internal memory circuit(s) such as Random Access Memory (RAM) and/or Non-Volatile RAM (NVRAM). The memory 120 may also comprise or be connected to a block storage 125 as discussed above.

The processor arrangement 110 may also connected to a Human Machine Interface 130 for receiving input from a user and for presenting data or other information to the user.

The processor arrangement 110 is also connected to a communications or network interface 140, such as a Network Interface Card (NIC). The computing device may be wirelessly connected to a communication network for accessing cloud services through the network interface 140. Alternatively or additionally, The computing device may be connected through a wired interface to a communication network for accessing cloud services through the network interface 140. Examples of wired connections are Ethernet, InfiniBand, Fiber Channel, to mention a few examples.

The network interface 140 may be configured to operate according to a long range standard, such as a cellular network standard GSM, LTE or a 5G standard. The network interface may alternatively or additionally be configured to operate according to a short range standard, such as a Bluetooth®, IEEE802.11b (WiFi™), IEEEE802.16, ZigBee™, WirelessHART (based on IEEE 802.15.4), ISA100.11a (based on IEEE 802.15.4) or NFC™ (Near Field Communication) standard.

Figure 2:
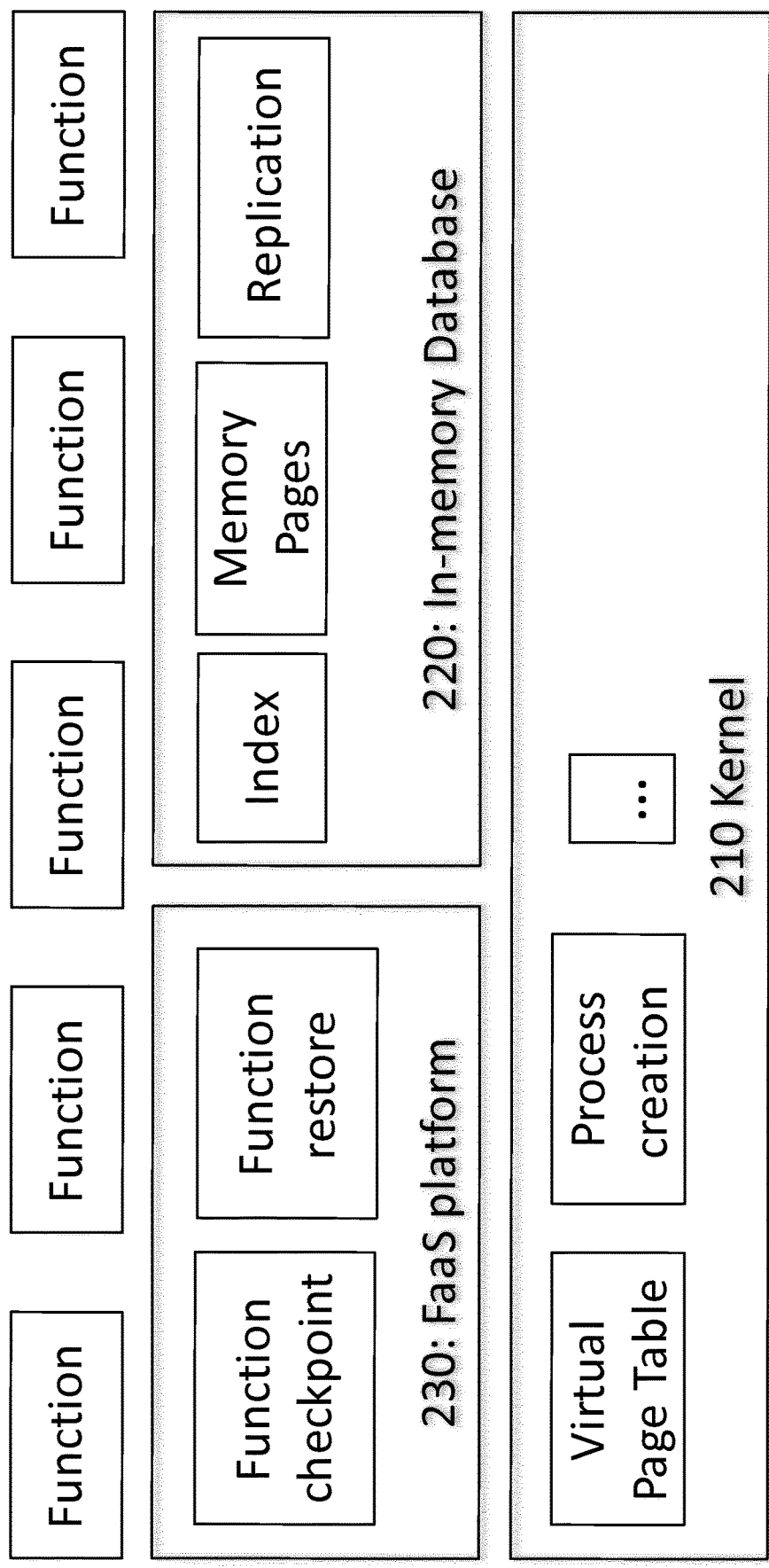
FIG. 2 shows a schematic overview of the software architecture of a computing device or User Equipment according to one embodiment of the present invention.

FIG. 2 shows a schematic overview of the software architecture of a computing device 100 or User Equipment (UE) according to one embodiment of the present invention. The Software architecture includes a kernel 210 comprising operating system functionalities such as for process creation, and for maintaining a virtual (memory) page table to mention some operating functions of the kernel 210. The kernel 210 is connected to or associated with an in-memory database 220 comprising memory storage indexing, for memory pages and for replication of data. The kernel 210 is also connected to or associated with an FaaS platform 230 comprising functionality for providing FaaS services, and comprising functionality for setting a function checkpoint and for performing a function restore operation. Various platform functions are associated with the FaaS platform 230 and the in memory database 220 for accessing memory pages during execution of a user function. The platform functions are arranged to interact with the kernel 210 for accomplishing at least part of its functionality, such as through system calls, kernel file based interfaces to mention a few examples.

Figure 3A:
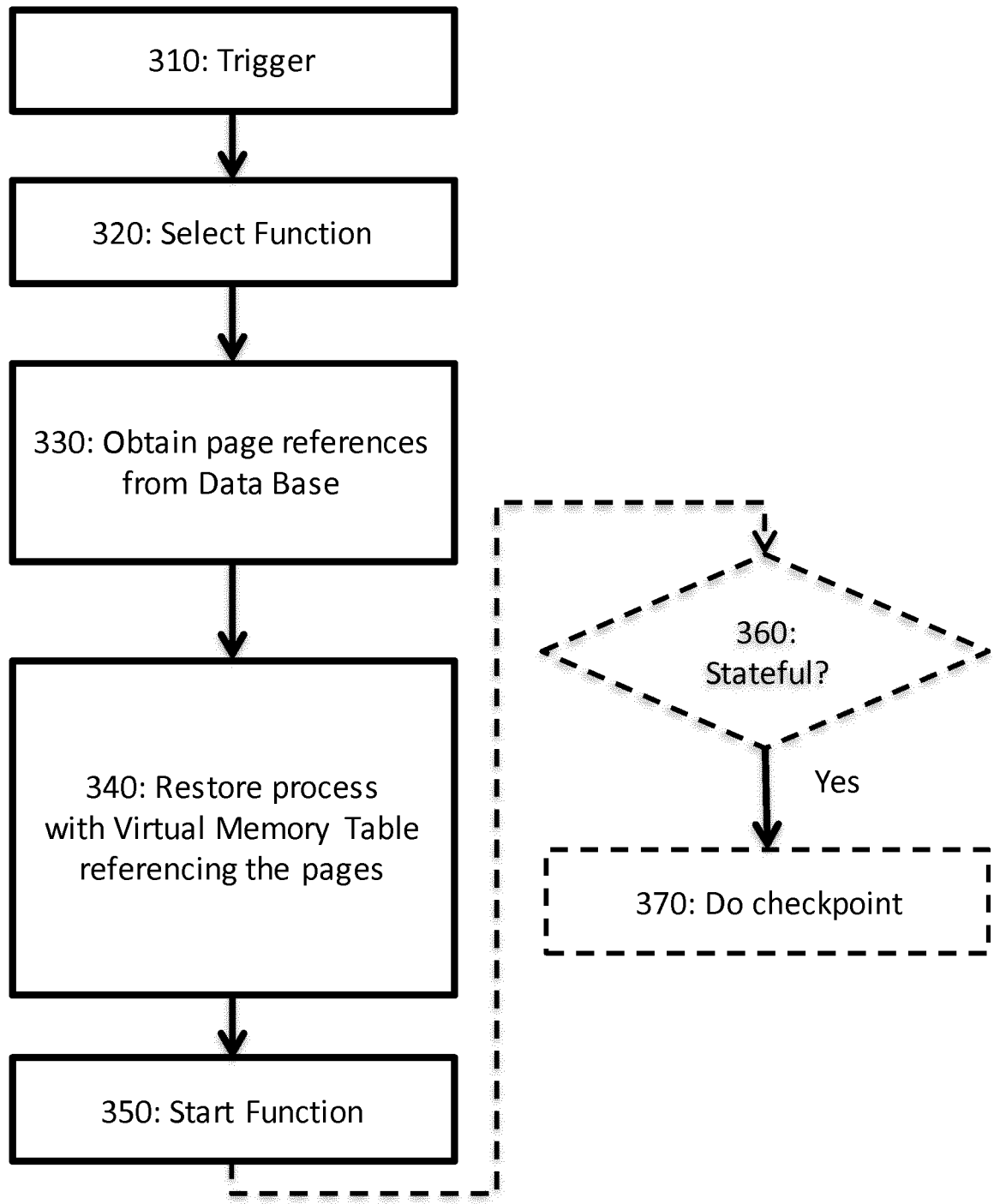
FIG. 3A and FIG. 3B each shows a flowchart for a general method according to herein for managing the memory of a computing device enabled for FaaS functionality such as in FIG. 1 according to one embodiment of the teachings of this application.
Figure 3B:
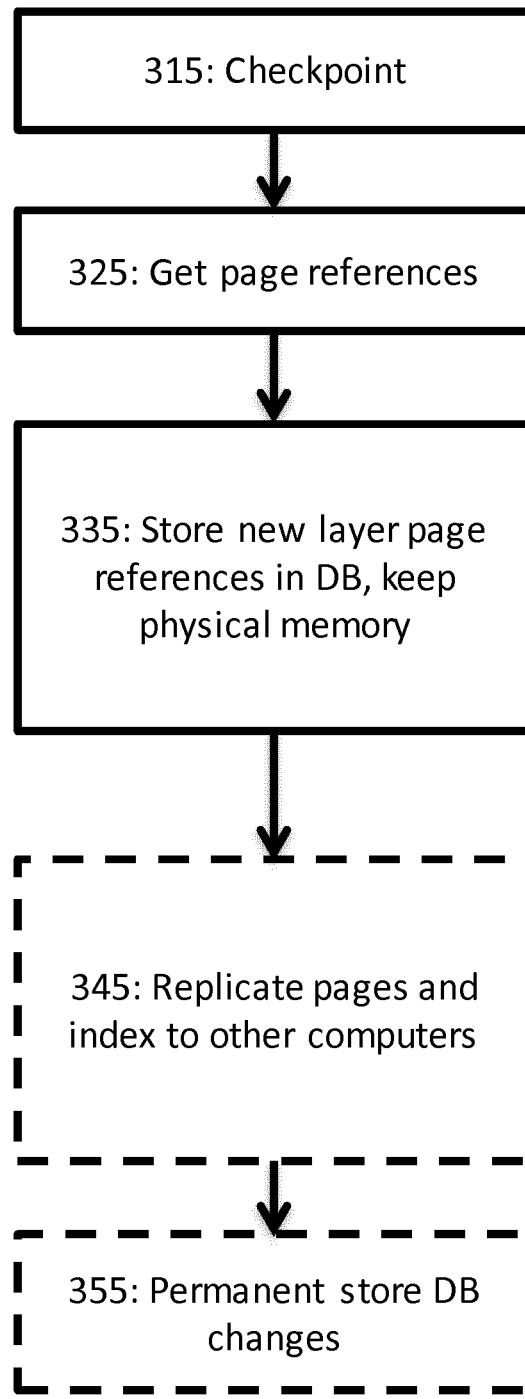
Figure 4A:
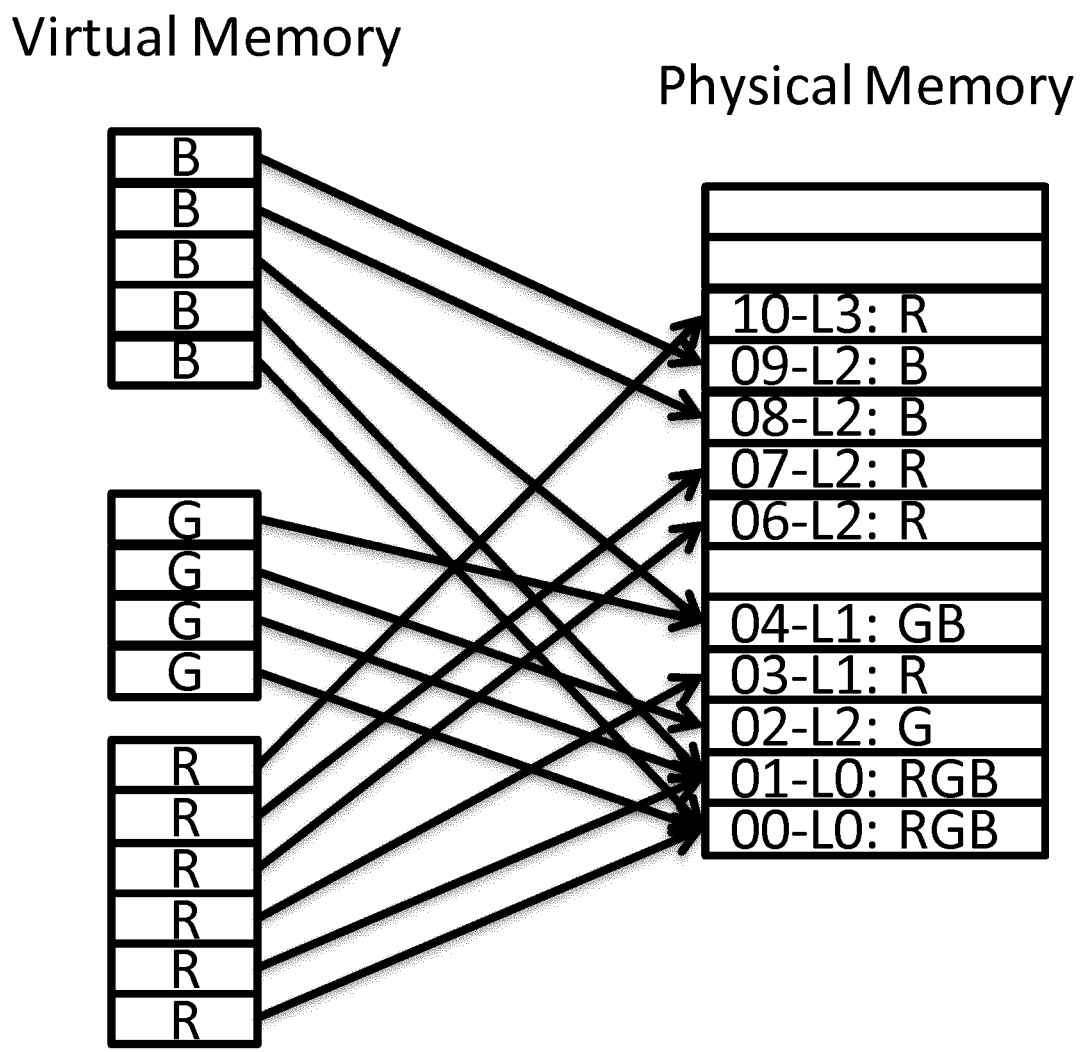
FIG. 4A shows how a virtual memory page table matches to a physical memory according to the teachings herein.
Figure 4B:
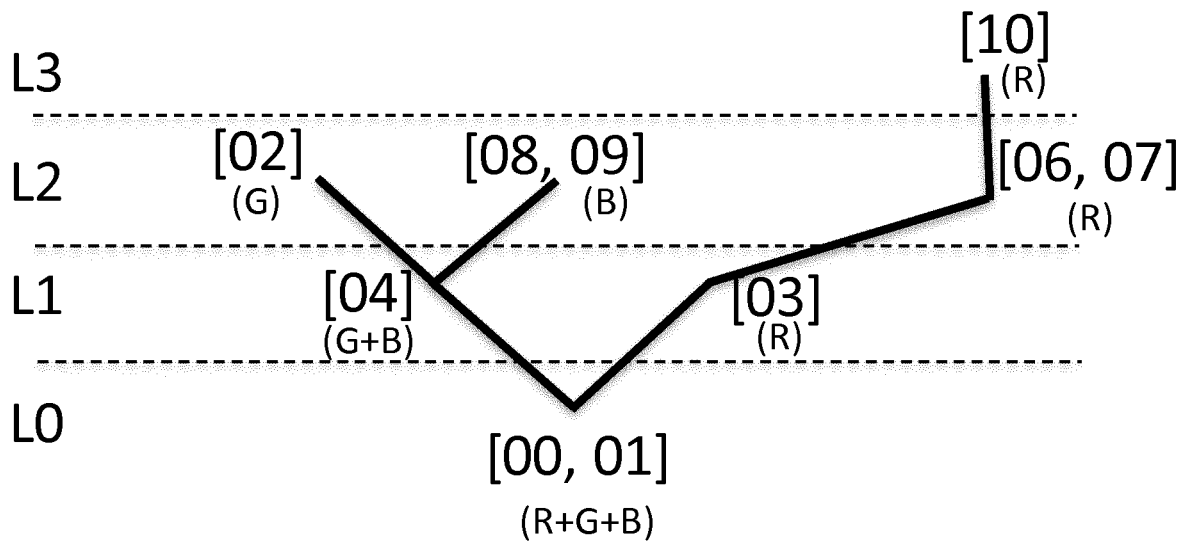
FIG. 4B shows a schematic view of a tree structure for the memory mapping according to one embodiment of the teachings of this application.

FIG. 3A and FIG. 3B each shows a flowchart for a general method according to herein for managing the memory of a computing device enabled for FaaS functionality such as in FIG. 1. The functionality of how a trigger is handled (FIG. 3A) and how a checkpoint is handled (FIG. 3B) will be disclosed with simultaneous reference to FIGS. 4A and 4b. FIG. 4a shows a schematic view of a memory structure and FIG. 4B shows a schematic view of a corresponding tree structure representing an in-memory database referencing.

FIG. 4A shows how a virtual memory page table matches to a physical memory, indicating three different processes R, G, B and being arranged in four layers L0, L1, L2 and L3. It should be noted that the figures only show one memory page, but it should be understood that this is for clarity purposes, and in a common embodiment, there will be a plurality of memory pages associated with each or at least one layer.

As stated above, the idea is to utilize a modified checkpoint/restore method in combination with an in-memory database. This may be done layer-by-layer, like a tree with branches of checkpointed environments. See for example FIG. 4B where the root is at the bottom of the figure in a corresponding layer L0. At the root is the common environment for example a container. Here one can see that the root corresponds to the lowest layer memory blocks which here corresponds to all three virtual memory page tables (part of the kernel referenced 210 in FIG. 2). At the first branch (corresponding to layer L1) e.g. a choice between a Java Virtual Machine (JVM), a Python Virtual Machine (PVM), or native packages, etc. The following branches (corresponding to layer L2) are for e.g. libraries or packages, and then (corresponding to layer L3) the functions and possibly the trigger data.

Each layer corresponds to changes that has been made to the physical memory of the corresponding process.

As stated above, when a new branch is to be created the previous checkpoint is restored and then the environment is altered with the new functionality before it is checkpointed again. This gives small changes to memory and hence most memory pages will still be shared with previous checkpoints A first aspect of the present invention is to modify the restore method of a checkpointing or checkpoint/restore framework (CRF) such as CRIU. A second aspect of this invention is to reduce the memory need for the in-memory database and the restored function's execution environment (a process).

Returning to FIG. 3A, a general method according to the teachings herein is shown for handling a triggering event whereupon a function's process is created or restored (if already created). An event associated with a trigger is received 310, whereby the associated function is selected 320. A trigger may be a request, such as a HTTP request or a MQTT request, commonly carrying new data to be processed. These are only a few examples of possible triggers and a skilled reader would understand that also other triggers may come in to play.

A function may be selected based on the request, the data carried by the request possibly indicting which function should be selected. Alternatively or additionally a function may be selected based on an address such as a URL (Uniform Resource Locator) associated with the request.

Page references to existing physical memory pages are obtained 330. The page references are obtained by looking up the selected function in a database which lists the page references for the selected function.

A process virtual memory table for a corresponding process is initiated with references to the existing physical memory pages and the process is restored (or created, from now on both referred to as executing the process) based on the process virtual memory table.

The process virtual memory table may be initiated by for example instructing the kernel 210 to populate the process virtual memory table with the associated references to physical memory pages provided from database virtual memory page references (more on the database virtual memory table below). This is thus one manner of initiating the process virtual memory table through memory mapping.

The function is then started 350. References to the physical memory pages are stored in the in-memory database in an aligned manner and the physical memory pages are thus ready to be used, without having to be copied.

The initiation (340) of the process virtual memory table may be made by compiling the physical page memory references from several layers based on the requested indexes (the requested indexes may be any of layer, function, environment, user, state, etc).

Optionally, the method may then continue with determining if the function or process is a stateful process 360 (i.e. capable of maintaining a state), and if so a checkpoint procedure 370 may be performed.

FIG. 3B shows a flowchart for a general method for performing a FaaS checkpoint on a process according to herein where a checkpoint is initiated 315 and page references are obtained 325 from the process and stored in a database virtual memory table. The page references are arranged in layers as above and stored in the in-memory database, while the physical memory pages are kept.

The page tables and indexes (i.e. the database virtual memory table) are replicated 345 to other computers through the network. And any changes to the in-memory database is stored 355 in the memory (possibly in the block storage). A change may be a change to the physical memory or that page references to the physical memory has been changed, added or removed.

Figure 5:
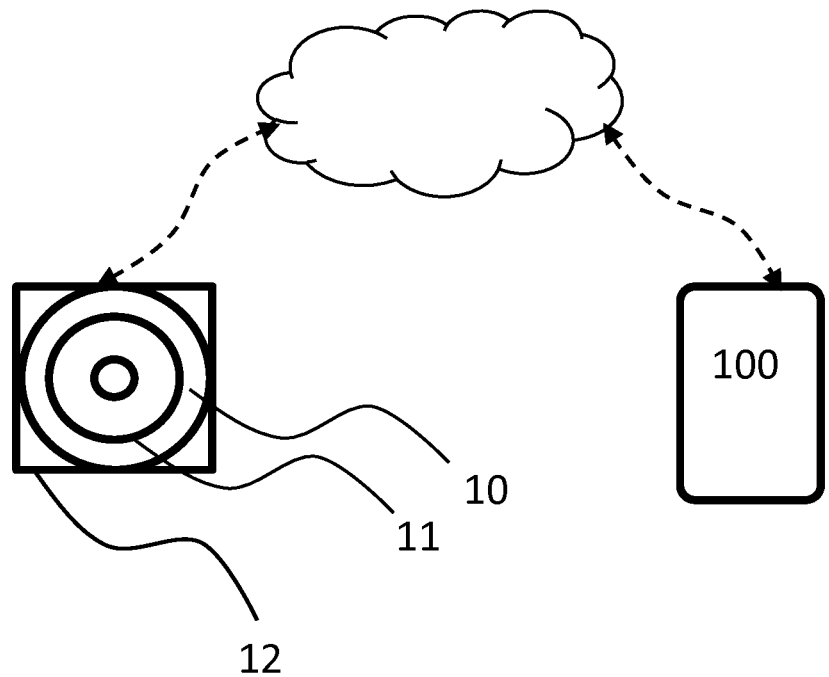
FIG. 5 shows a schematic view of a computer-readable medium according to the teachings herein.

FIG. 5 shows a schematic view of a computer-readable medium as described in the above. The computer-readable medium 10 is in this embodiment a data disc 10. In one embodiment the data disc 10 is a magnetic data storage disc. The data disc 10 is configured to carry instructions 11 that when loaded into a processor arrangement 110, such as a processor such as the controller of the device 100 of FIG. 1, execute a method or procedure according to the embodiments disclosed above. The data disc 10 is arranged to be connected to or within and read by a reading device 12, for loading the instructions into the processor arrangement 110. One such example of a reading device 12 in combination with one (or several) data disc(s) 10 is a hard drive. It should be noted that the computer-readable medium can also be other mediums such as compact discs, digital video discs, flash memories or other memory technologies commonly used. In such an embodiment the data disc 10 is one type of a tangible computer-readable medium 10.

The instructions 11 may also be downloaded to a computer data reading device 100, such as the processor arrangement of the computing device 100 or other device capable of reading computer coded data on a computer-readable medium, by comprising the instructions 11 in a computer-readable signal which is transmitted via a wireless (or wired) interface (for example via the Internet) to the computer data reading device 100 for loading the instructions 11 into a processor arrangement 110. In such an embodiment the computer-readable signal is one type of a non-tangible computer-readable medium 10. The instructions may be stored in a memory (not shown explicitly in FIG. 5, but referenced 120 in FIG. 1) of the computer data reading device 100.

The instructions comprising the teachings according to the present invention may thus be downloaded or otherwise loaded in to a device 100 in order to cause the device 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for use in a computing device for executing a function-as-a-service (FaaS) process, wherein the method comprises:
   receiving an event associated with a trigger, whereby an associated function is selected;
   obtaining page references to existing physical memory pages for the selected function, wherein the page references are arranged in one or more layers in an in-memory database, each of the one or more layers corresponding to changes made, in physical memory, to a process corresponding to the selected function, in a checkpointed environment;
   initiating a process virtual memory table for the process corresponding to the selected function; and
   executing the process based on the process virtual memory table;
   wherein the initiation of the process virtual memory table is made by compiling the physical page memory references from at least one layer based on the requested indexes.

2. The method of claim 1, wherein the physical memory pages are stored in the in-memory database in an aligned manner and are thus ready to be used without having to be copied.

3. The method of claim 1, wherein the process virtual memory table is initiated with references to the existing physical memory pages.

4. The method of claim 1, wherein the method further comprises determining whether the process is a stateful process, and if so performing a checkpoint procedure.

5. A non-transitory computer-readable storage medium encoded with instructions that, when executed on a processor, perform the method according to claim 1.

6. A method for use in a computing device for performing a function-as-a-service (FaaS) checkpoint operation, wherein the method comprises:
   initiating a checkpoint;
   obtaining page references and storing them in a database virtual memory table in an in-memory database;
   replicating the page references and corresponding indexes through a network; and
   storing changes to the in-memory database.

7. The method of claim 6, wherein the page references are arranged in layers and stored in the in-memory database.

8. A non-transitory computer-readable storage medium encoded with instructions that, when executed on a processor, perform the method according to claim 6.

9. A computing device for executing a function-as-a-service (FaaS) process, said computing device comprising a processor and a memory configured to:
   receive an event associated with a trigger, whereby an associated function is selected;
   obtain page references to existing physical memory pages for the selected function, wherein the page references are arranged in one or more layers in an in-memory database, each of the one or more layers corresponding to changes made, in physical memory, to a process corresponding to the selected function, in a checkpointed environment;
   initiate a process virtual memory table for the process corresponding to the selected function, by compiling the physical page memory references from at least one layer based on the requested indexes; and
   execute the process based on the virtual memory table.

10. The computing device of claim 9, wherein the processor and memory are configured to access physical memory pages stored in the in-memory database in an aligned manner without having to copy the physical memory pages.

11. The computing device of claim 9, wherein the processor and memory are configured to initiate the process virtual memory table with references to the existing physical memory pages.

12. The computing device of claim 9, wherein the processor and memory are configured to determine whether the process is a stateful process, and if so perform a checkpoint procedure.

13. A computing device for performing a FaaS checkpoint operation, said computing device comprising a processor and a memory configured to:
   initiate a checkpoint;
   obtain page references and storing them in a database virtual memory table in an in-memory database;
   replicate the page references and corresponding indexes through a network; and
   store changes to the in-memory database.

14. The computing device of claim 13, wherein the processor and memory are configured to arrange the page references in layers and store the page references in the in-memory database.

* * * * *